(12) United States Patent
Hartl

(10) Patent No.: US 11,597,435 B2
(45) Date of Patent: Mar. 7, 2023

(54) DRILLING RIG

(71) Applicant: BAUER Maschinen GmbH, Schrobenhausen (DE)

(72) Inventor: Michael Hartl, Augsburg (DE)

(73) Assignee: BAUER Maschinen GmbH, Schrobenhausen (DE)

( * ) Notice: Subject to any disclaimer, the term of this patent is extended or adjusted under 35 U.S.C. 154(b) by 615 days.

(21) Appl. No.: 16/700,743

(22) Filed: Dec. 2, 2019

(65) Prior Publication Data

US 2021/0163066 A1 Jun. 3, 2021

(51) Int. Cl.
| *E21B 15/00* | (2006.01) |
| *B62D 7/04* | (2006.01) |
| *B62D 7/02* | (2006.01) |
| *B62D 13/00* | (2006.01) |
| *B62D 53/00* | (2006.01) |

(52) U.S. Cl.
CPC ............... *B62D 13/00* (2013.01); *B62D 7/04* (2013.01); *B62D 53/00* (2013.01); *E21B 15/00* (2013.01); *B62D 7/026* (2013.01)

(58) Field of Classification Search
CPC .......... B62D 7/04; B62D 7/026; B62D 13/00; B62D 53/00; E21B 15/00; E21B 15/003
USPC ....................................................... 180/14.2
See application file for complete search history.

(56) References Cited

U.S. PATENT DOCUMENTS

| 10,487,582 B2 * | 11/2019 | Wright | .................... E21B 19/07 |
| 2015/0114717 A1 * | 4/2015 | Fortson | ................. E21B 15/003 |
| | | | 175/203 |
| 2018/0093705 A1 * | 4/2018 | Nguyen | ................... B62D 7/04 |

* cited by examiner

*Primary Examiner* — Kevin Hurley
*Assistant Examiner* — Felicia L. Brittman
(74) *Attorney, Agent, or Firm* — Studebaker & Brackett PC

(57) ABSTRACT

The invention relates to a drilling rig with a drilling tower, a base structure, on which the drilling tower is arranged, and at least three support units being part of the base structure, each support unit having at least one wheel rotatable around a horizontal wheel axis, wherein at least one of the support units comprises a vertical steering axis, around which the at least one wheel can be turned by a steering drive. The invention further relates to a method for moving such a mobile drilling rig.

13 Claims, 7 Drawing Sheets

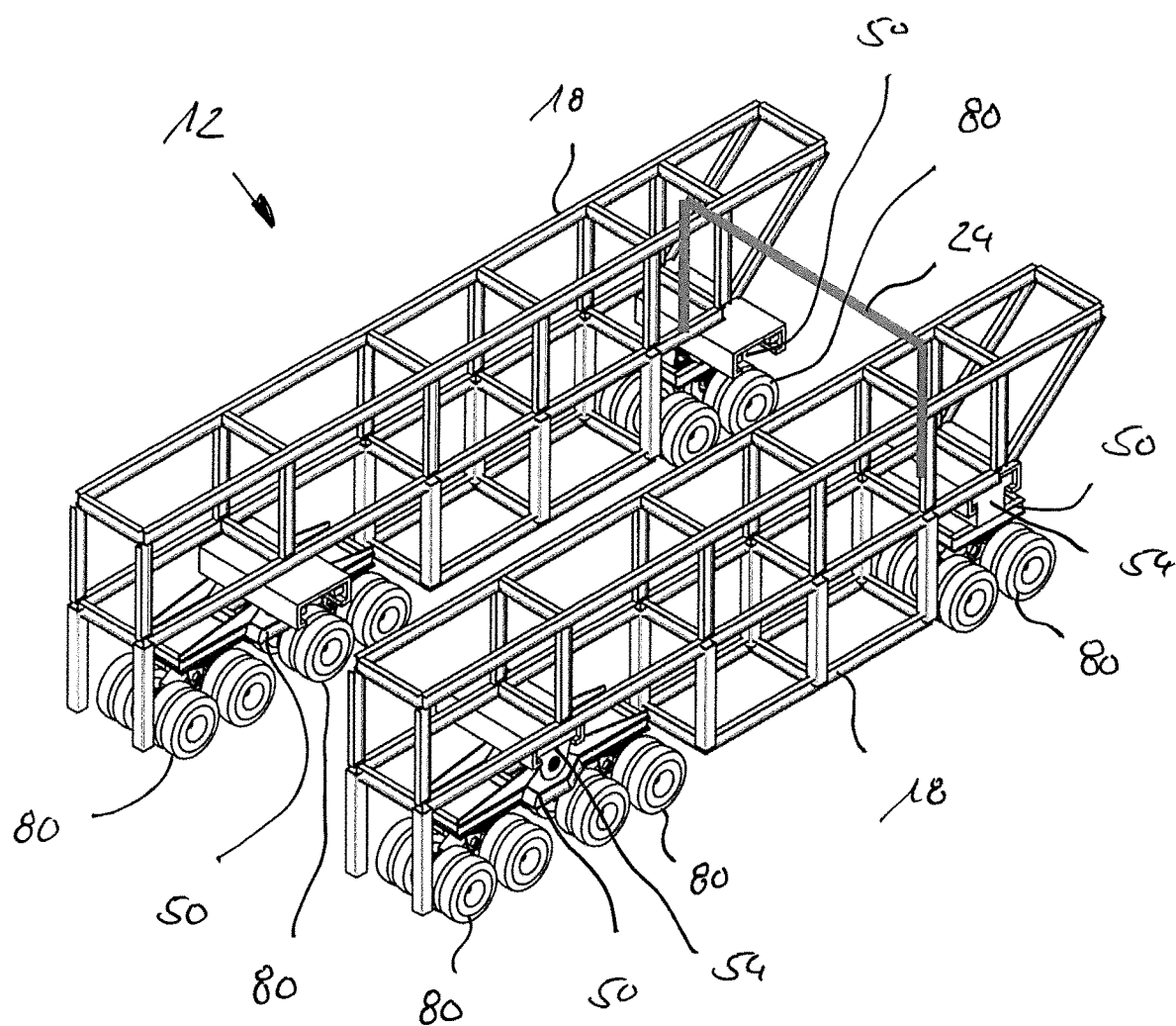

DRILLING RIG

FIELD OF THE INVENTION

The invention relates to a drilling rig having a drilling tower, a base structure, on which the drilling tower is arranged, and at least three support units being part of the base structure, each support unit having at least one wheel rotatably around a horizontal axis.

BACKGROUND OF THE INVENTION

Drilling rigs are well known and used, for example, for oil and gas well drilling. Smaller drilling devices can be arranged on a vehicle/truck or trailer to be mobile. Larger drilling rigs have a stationary design and have to be disassembled for transportation.

For dislocation of larger drilling rigs within a range of up to some hundred kilometers, it is known to arrange at the basis structure of the drilling rig support units with large, over-sized wheels, by which the drilling rig can be lifted for being moveable. After lifting, the drilling rig is connected via one or more cables or rods with one or more tractor vehicles, by which the drilling rig is driven and pulled to a new location. By such a known arrangement a time-consuming and expensive disassembling and reassembling of the drilling rig can be avoided. Further, the used large wheels are expensive and difficult to replace. In case of a collapse of at least one of the large wheels during movement, the drilling rig might be destabilized. It might even happen that the remaining wheels are overloaded and collapse, too.

The fixing of the support units, the lifting motion by such support units as well as the connection and pulling of the drilling rig by tractor vehicles are delicate and complex tasks, in particular if the drilling rig has to be moved along a curved, non-linear way.

SUMMARY OF THE INVENTION

The invention is based on the object to provide a drilling rig which would allow an efficient and secure dislocation.

In accordance with the invention, the object is achieved by a drilling rig having a drilling tower, a base structure, on which the drilling tower is arranged, and at least three support units being part of the base structure, each support unit having at least one wheel rotatably around a horizontal wheel axis, wherein at least one of the support units comprises a vertical steering axis, around which the at least one wheel can be turned by a steering drive.

A basic idea of the invention is integrally providing support units with wheels at the base structure of larger drilling rigs.

According to another aspect of the invention, the at least one wheel of each support unit is turnable around a vertical steering axis by means of a steering drive. This allows a navigation and manoeuvering of the drilling rig within limited space and on relatively small, non-linear ways.

According to a preferred embodiment of the invention, four support units are provided, each support unit being arranged at one of the corners of the rectangular base structure. The arrangement of four movable support units at each corner of the base structure allows a reliable support and precise movement of the drilling rig.

Usually the drilling rig can be propelled by on or more tractor vehicles. According to an advantageous embodiment of the invention, at least one of the support units comprises a wheel drive for rotatably driving at least one wheel for providing a self-propelling of the mobile drilling rig. The support units comprise a wheel drive for rotatably driving at least one wheel. Thus, the mobile drilling rig can be self-propelling. This allows a quick and efficient displacement of the drilling rig from a first location to another second location. Additional tractor vehicles and their connections to the drilling rig by pulling cables, rods or other joints can be avoided.

For enhancing the stability of the mobile drilling rig it is advantageous that additional support units are provided at the base structure between the support units arranged at the corner portions. The support units can be of the same design. They can be arranged on the under side or lateral flanks of the support structure.

In general, only one or two support units can be provided with a steering axis and one steering drive. However, for a precise steering and an efficient mobility, it is preferred that each support unit is steerable and comprises at least one vertical steering axis and a steering drive. The steering drive can be a rotary drive, which for example is activated electrically or hydraulically. The steering drive can be provided with an appropriate gear box, in particular a reduction gear box. Alternatively, the steering drive can comprise a linear drive like a hydraulic jack, wherein the linearly movement is transferred to a turning movement via a lever mechanism or a gear rack.

In addition, it is of particular advantage that each support units comprises at least one wheel drive. The wheel drive can comprise an electric drive, a hydraulic drive or any suitable combustion engine. The rotary wheel drive can also be equipped with any suitable gear box, in particular a reduction gear box.

An advanced stability is achieved according to another preferred embodiment in that the support unit comprises at least one first wheel rotatable around a first wheel axis and at least one second wheel rotatable around a second wheel axis being distant and parallel to the first wheel axis, and the first wheel axis and the second wheel axis are arranged at one common carrier element. Further wheel axes, in particular three or four wheel axes can be arranged distant and parallel to each other on the common carrier element.

For a secure manoeuvering on the ground it is advantageous that the carrier element is mounted swingable around a horizontal swing axis, which is arranged between the first wheel axis and the second wheel axis. Such, the support units can compensate in a certain degree of unevenness of the ground.

Furthermore, according to another embodiment of the invention, it is preferred that at least two first wheels are arranged rotatably around the first wheel axis and at least two second wheels are arranged rotatably around the second wheel axis. For enlarging the load capacity of each support unit, further wheels can be arranged on each wheel axis.

The mobility of the drilling rig is further enhanced in that the carrier element is mounted swingably at a mounting part, which itself is mounted turnably around the vertical steering axis at a support base of the support unit. By that, a higher flexibility of the wheel arrangement is provided.

According to another preferred embodiment of the invention, a common control unit is provided for controlling the steering drives and the wheel drives of the support units. The control unit can be arranged on the drilling rig itself or alternatively or additionally the common control unit can be provided in a separate control vehicle. The common control unit can be connected with individual sub-control units at each support unit by means of a wired or wireless communication system. The operator is preferably located in the control vehicle, for example an off-road car.

A further improvement regarding stability can be achieved in that the drilling tower comprises at least one horizontal folding axis, around which at least a part of the drilling tower can be folded downwards. For transportation, the drilling tower can be folded down in order to reduce the height of the drilling rig. Consequently, the center of gravity is lowered and any risk of tilting of the drilling rig during movement is reduced.

According to another preferred embodiment of the invention, at the base structure a plurality of support feet is arranged, which are adjustable relative to the support units for supporting the drilling rig after movement and during drilling operation. The support feet can be retracted vertically or adjusted in any other way into a transfer position during movement of the drilling rig. After having reached the final position, the support feet of the drilling rig can be extended downwards and/or sidewards for contacting the ground. By the extension of the support feet, the support units with the wheels can be released. In the stationary position, the load of the drilling rig is completely or substantially received by the extended support feet.

According to another advantageous embodiment of the invention, the wheels are of regular size having a diameter of not more than 2 meters. Thus, wheels with tyres of common construction machines and vehicles, like trucks and trailers, can be used. Such wheels and tyres are usually stored at job sites or distributors and can be easily provided.

Furthermore, the invention relates to a method for moving the drilling rig as described above.

In particular, the drilling rig is steered by the support units and self-propelled or propelled by one or more tractor vehicles. In case of self-propelling, any additional tractor vehicle for moving the drilling rig can be avoided or at least the number of tractor vehicles can be reduced.

BRIEF SUMMARY OF DRAWINGS

In the following, the invention is described further by way of preferred embodiments illustrated schematically in the drawings, wherein show:

FIG. 7 a perspective view of a part of the base structure of the drilling rig.

DETAILED DESCRIPTION OF A PREFERRED EMBODIMENT

Figure 1:
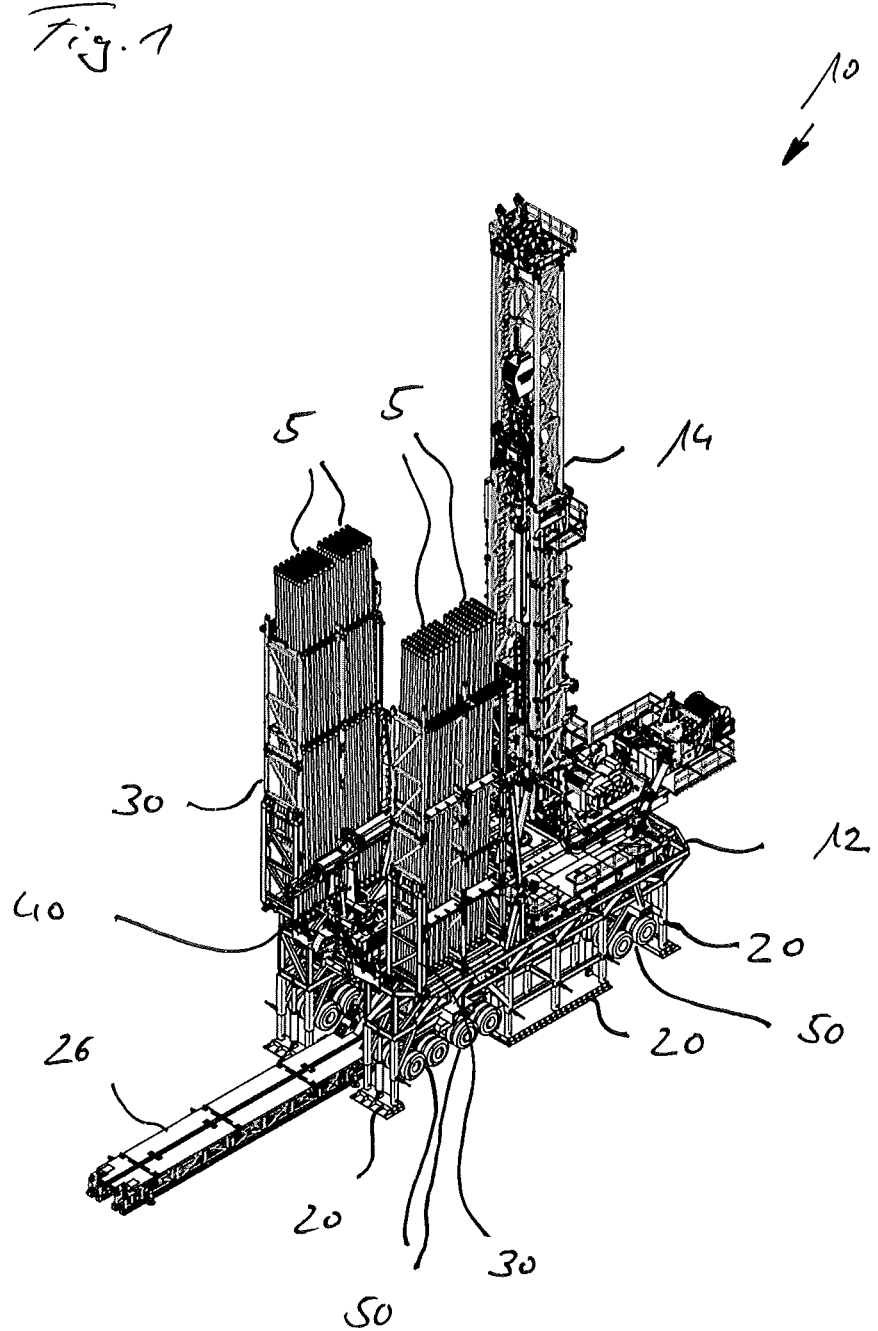
FIG. 1 a perspective view of a drilling rig in its stationary position for operation according to the invention.
Figure 2:
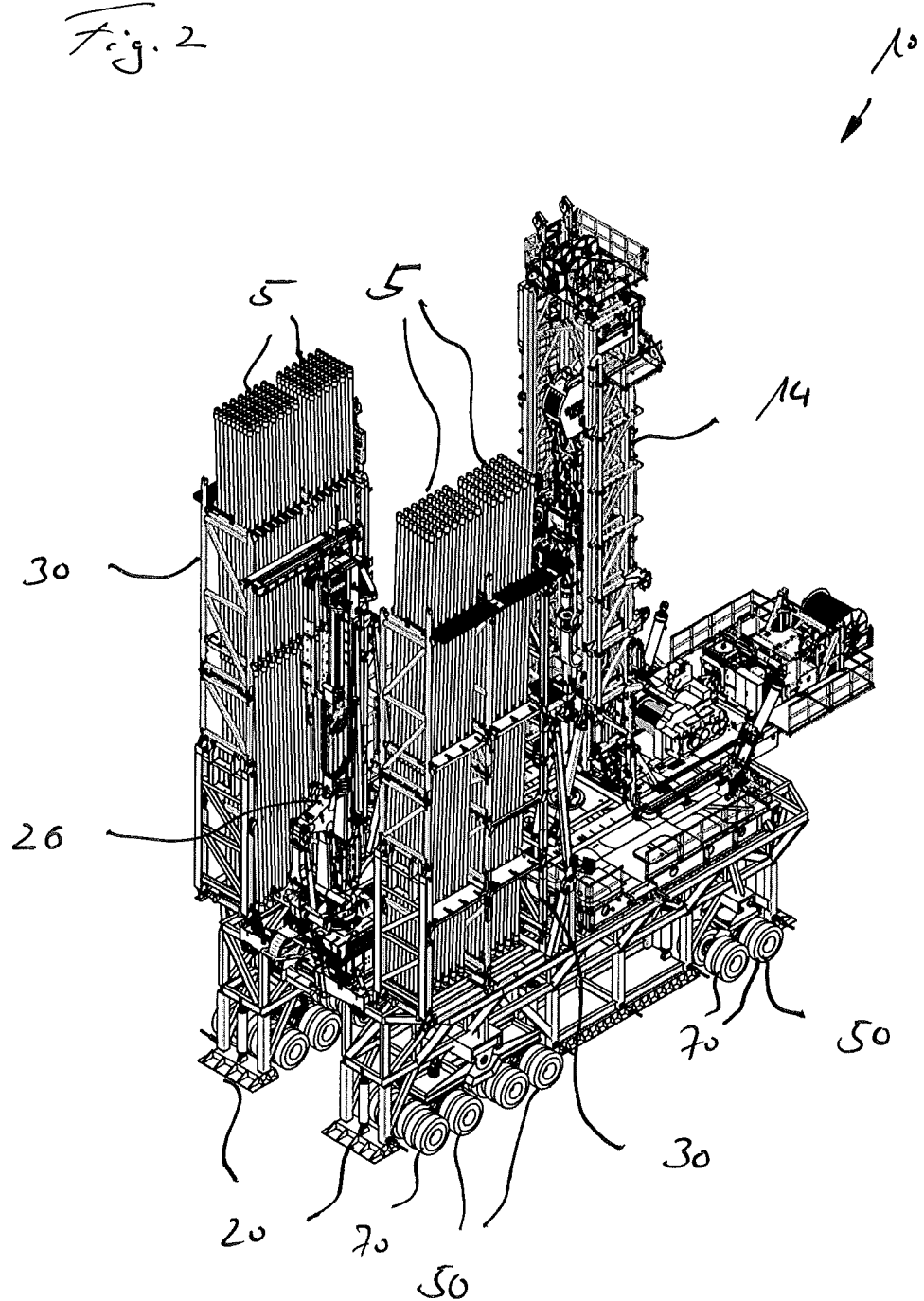
FIG. 2 another perspective view of the drilling rig of FIG. 1 in a stationary position after removing a supply bed.

According to FIGS. 1 and 2 a drilling rig 10 according to the invention is shown. The drilling rig 10 comprises a substantially rectangular or prismatic base structure 12 designed as a beam construction. On the upper side of the base structure 12 a drilling tower 14 being telescopically extendable is arranged. In FIG. 1 the drilling tower 14 is shown in its extended position, while FIG. 2 shows the retracted position.

Furthermore, on the upper side of the base structure 12 two foldable drill rod magazines 30 are positioned being loaded with a plurality of drill rods 5. Further, according to FIG. 1 a horizontal supply bed 26 is arranged at a front side of the drilling rig 10 for additionally supplying drill rods. By means of a handling apparatus 40, drill rods 5 can be manipulated and conveyed from the drill rod magazines 30 or the supply bed 26 to the drill tower 14 or in a similar way from the drill tower 14 back to the drill rod magazine 30 or the supply bed 26. The drilling rig 10 is provided with all other necessary equipment, like drives, winches, control units, hydraulic systems etc., being well known for the use of drilling rigs for well drilling.

According to the invention, the drilling rig 10 is mobile and provided with support units 50 having wheels 70 at the lower corner portions of the base structure 12. In the stationary position of the mobile drilling rig 10, for example during drilling operation, as shown in FIG. 1, support feet 20 are vertically extended relative to the wheels 70 towards the ground in such a way that the base structure 12 rests on these support feet 20. In this stationary position according to FIG. 1, the support units 50 are distant from the ground. The support feet 20 and/or the support units 50 with the wheels 70 are mounted to be lifted.

Figure 3:
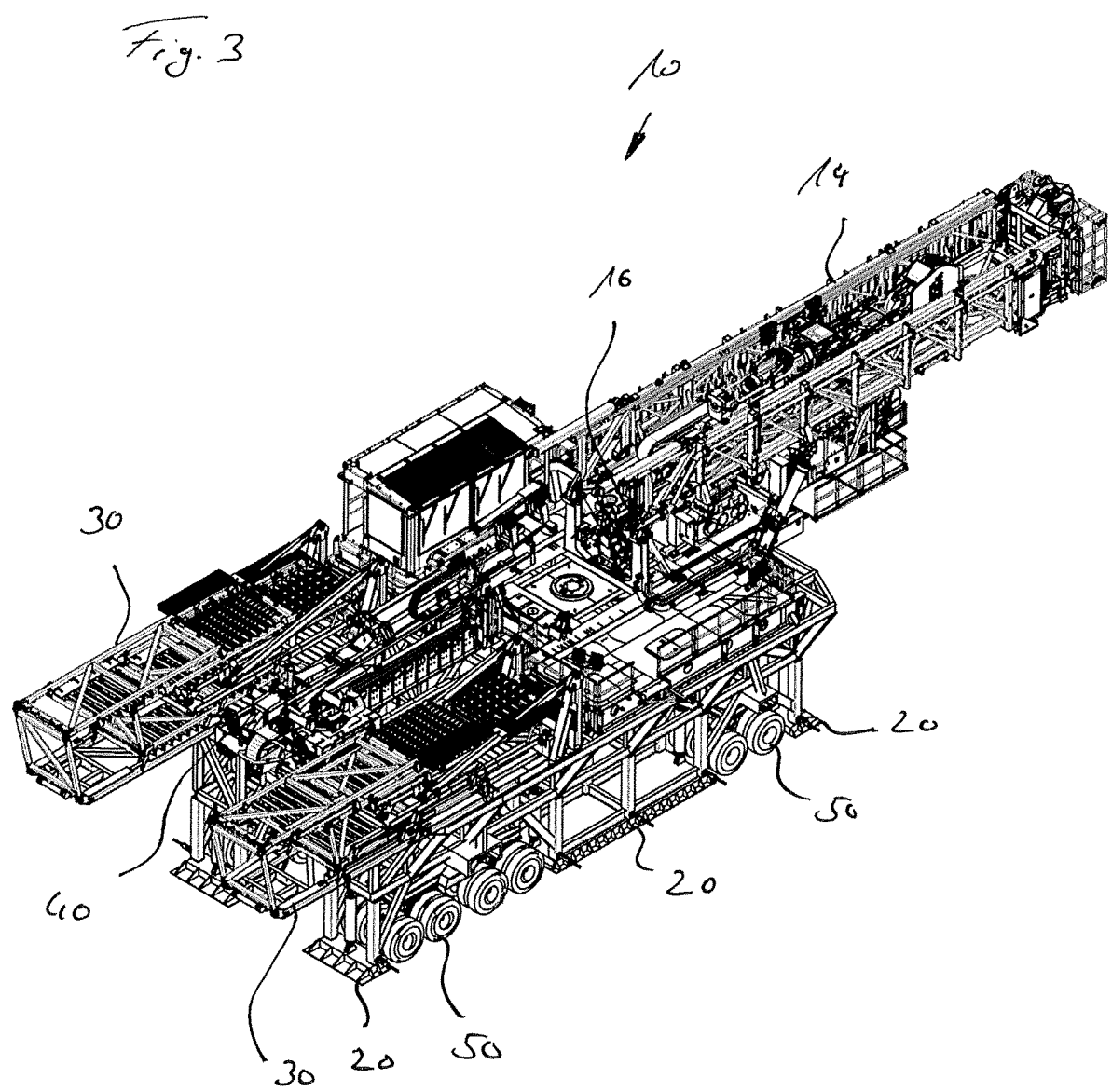
FIG. 3 a perspective view of the drilling rig of FIGS. 1 and 2 in condition for movement.

After drilling operation has been finished at one location, the mobile drilling rig 10 can easily be converted for transportation as is shown in more detail in connection with the FIGS. 2 and 3. For this conversion, the supply bed 26 is removed from the mobile drilling rig 10. Furthermore, the drilling tower 14 can be vertically retracted into the retracted position according to FIG. 2. The drill rods 5 can be removed from the drill rod magazines 30 or alternatively the drill rod magazines 30 together with the drill rods 5 can be released and removed from the base structure 12. By means of hydraulic jacks, the support feet 20 can be vertically retracted and vertically lifted away from the ground such that the support unit 50 with the wheels 70 came into contact with the ground surface.

As shown in FIG. 3, the retracted drilling tower 14 can be folded around a horizontal folding axis 16 from its vertical position to the horizontal position. Further, the drill rod magazine 30 and the handling apparatus 40 can also be folded into a horizontal position as shown in FIG. 3. In this way, the center of gravity of the mobile drilling rig 10 is moved downwards for enhancing stability of the mobile drilling rig 10 during movement.

As will be explained later, the drilling rig 10 can be self-propelled and in the mobile position as shown in FIG. 3, the mobile drilling rig 10 can be moved to another location on its own without any support of additional tractor vehicles or with a reduced number of such vehicles.

Figure 4:
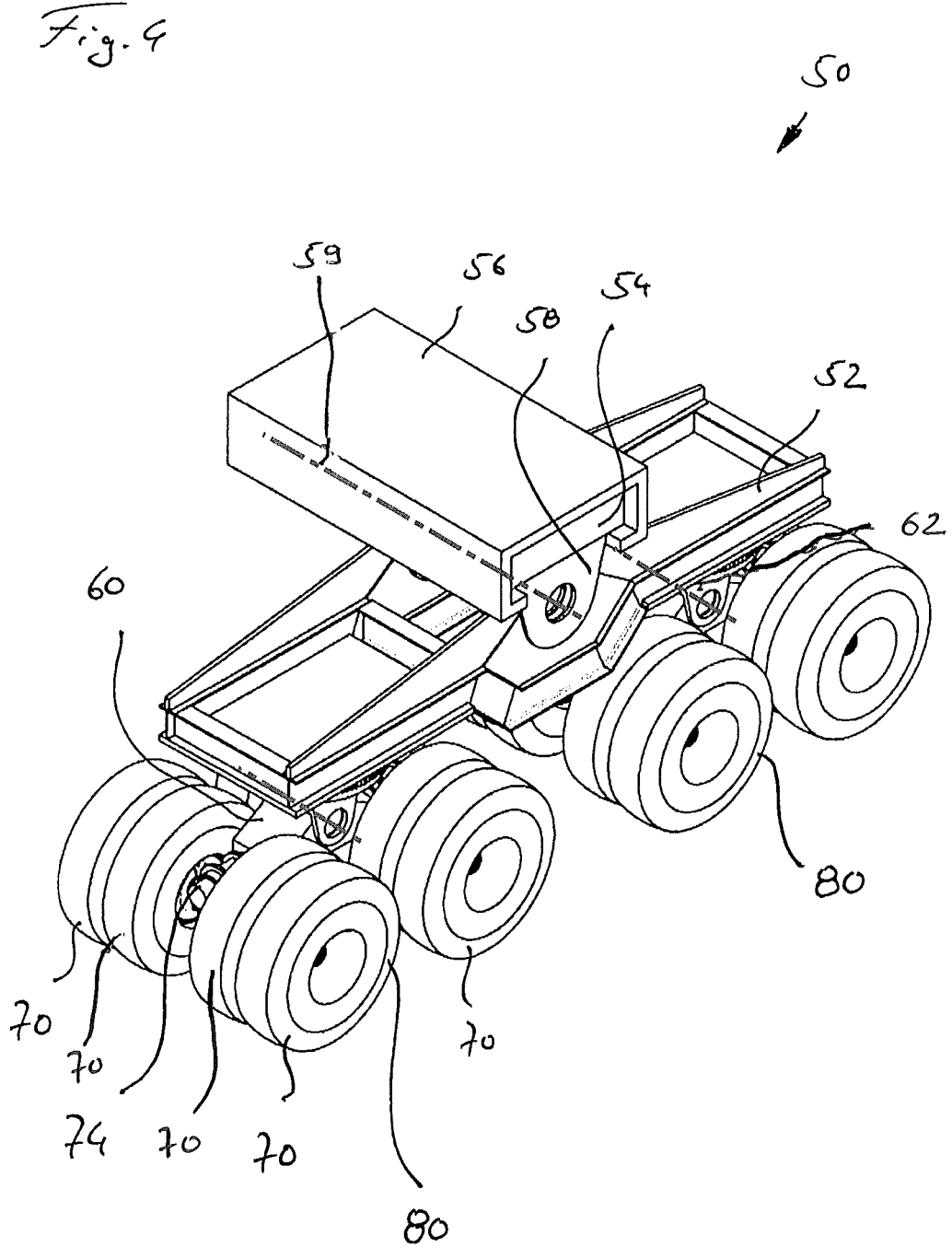
FIG. 4 an enlarged perspective view of a support unit for a drilling rig according to the invention.
Figure 5:
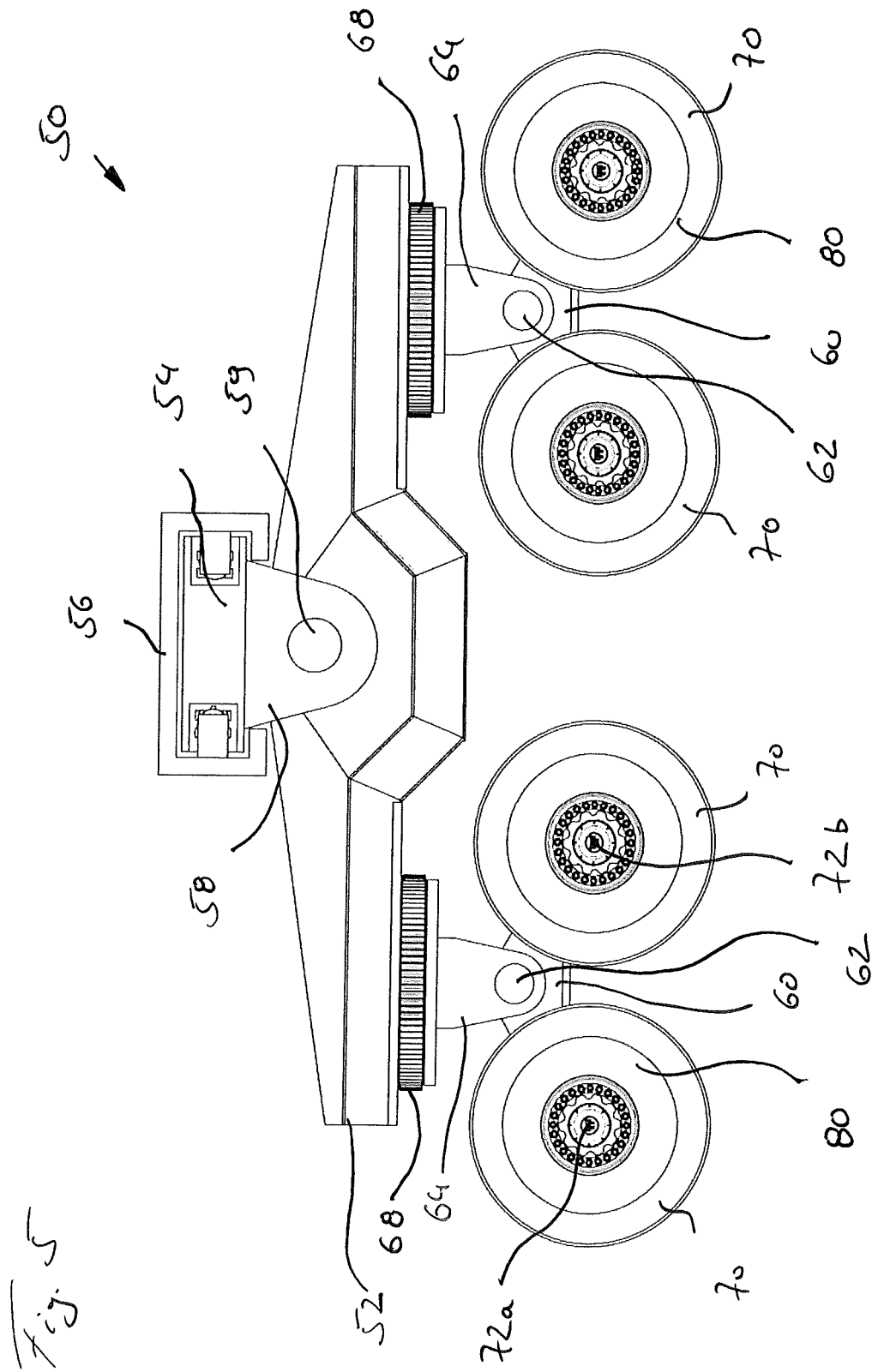
FIG. 5 a side view of the support unit of FIG. 4.
Figure 6:
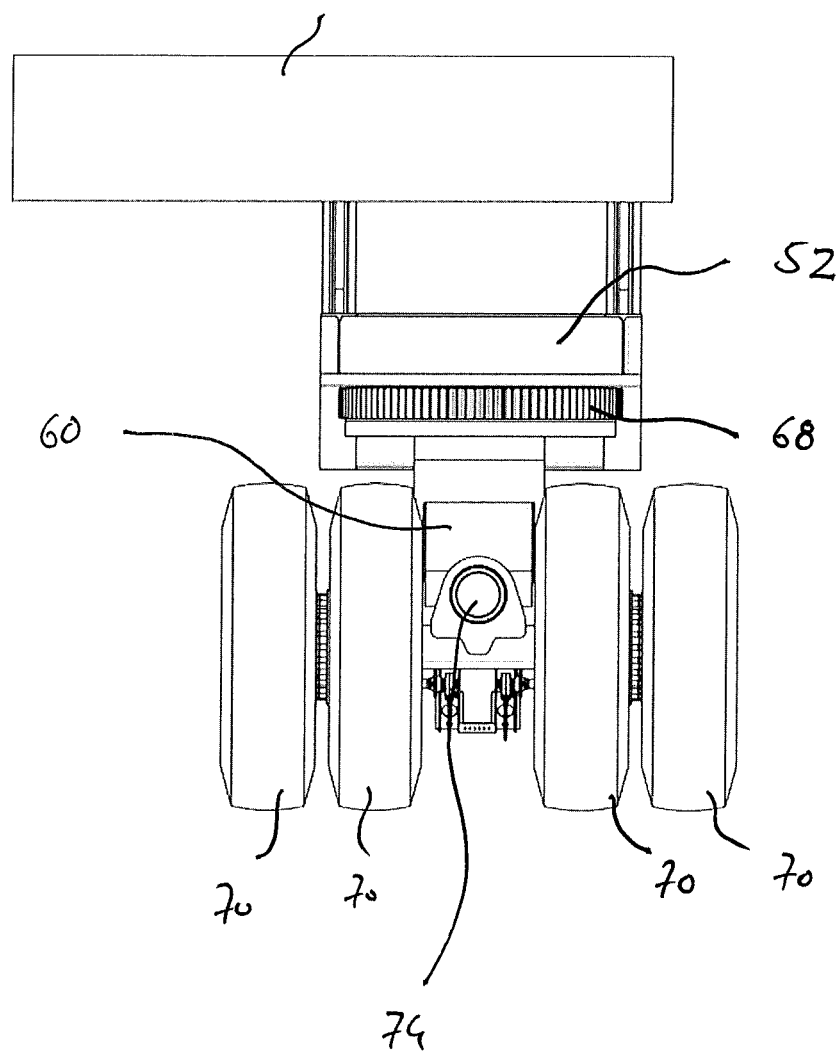
FIG. 6 a front view of the support unit of FIGS. 4 and 5.

An example for a support unit 50 for the mobile drilling rig 10 according to the invention is shown and explained in connection with the FIGS. 4 to 6. The shown support unit 50 comprises a horizontally arranged support beam 54, which is movably mounted in a box-shaped linear guiding 56 being fixed at the support structure 12. By hydraulic jacks being not shown, the support beam 52 can be horizontally moved within the linear guiding 56 for changing the track of the mobile drilling rig 10.

On the lower side of the movable support beam 54 a pair of bearing brackets 58 are fixed, between which a beam-like support base 52 is swingably mounted around a first swinging axis 59. The first swinging axis 59 is arranged in the center of the horizontally directed support base 52. At the under side of the support base 52 at its opposite end portions two wheel arrangements 80 are mounted.

Both wheel arrangements 80 have the same design and comprise a central carrier element 60, on the lateral side of which are rotatably mounted four wheels 70. In this shown example, the wheels 70 are designed as double wheels, thus eight individual wheels 70 are arranged. A first pair of wheels 70 are mounted on a first wheel axis 72a and a second pair of wheels 70 are mounted on a second wheel axis 72b, which is parallel and distant from the first wheel axis 72a. For driving the wheels 70, on the carrier element 60 at least one wheel drive 74 is arranged on a front side of the carrier element 60.

The carrier element 60 is swingably mounted around a horizontal second swinging axis 62 on a mounting part 64. The mounting part 64 with the second swinging axis 62 are arranged in the center between the wheels 70 of the wheel arrangement 80. The mounting part 64 is rotatably mounted around a vertical steering axis on the underside of the horizontal support base 52. By means of a steering drive 68 having a gear arrangement, the mounting part 64 with its wheel arrangement 80 can be turned or swiveled around the vertical steering axis for steering the mobile drilling rig 10 during its movement. The steering drive 68 and the wheel drives 74 can be energized in any suitable way, in particular by electric or hydraulic energy.

Lateral parts 18 of the base structure 12 are shown in FIG. 7. At the front side, i.e. the V-door-side, of each of the two lateral parts 18 one support unit 50 with two wheel arrangements 80 is positioned, while at each of the opposite rear sides one support unit 50 with only one wheel arrangement 80 is located. In the shown arrangement according to FIG. 7 the support beams 54 are in its laterally retracted position. By means of hydraulic pressure the beams 54 with the wheel arrangements 80 can be extended in a horizontal direction for adjusting an enlarged track of the mobile drilling rig 10. The laterally opposite support units 50 may be connected and coupled by a hydraulic link 24. By this hydraulic link 24 a height level of at least two support units 30 can be adjusted, balanced and/or buffered.

The invention claimed is:

1. A drilling rig having
a drilling tower,
a base structure, on which the drilling tower is arranged, and
at least three support units being part of the base structure, each support unit having at least one wheel rotatable around a horizontal wheel axis,
wherein
at least one of the support units comprises a vertical steering axis, around which the at least one wheel can be turned by a steering drive, wherein
each support unit comprises at least one first wheel rotatable around a first wheel axis and at least one second wheel rotatable around a second wheel axis being distant and parallel to the first wheel axis,
the first wheel axis and the second wheel axis are arranged at one common carrier element, and
the carrier element is mounted swingably around a horizontal swing axis, which is arranged between the first wheel axis and the second wheel axis.

2. The drilling rig according to claim 1,
wherein
the base structure is a rectangular base structure having four corner portions, and
four support units are provided, each support unit being arranged at one of the four corner portions of the rectangular base structure.

3. The drilling rig according to claim 2,
wherein
additional support units are provided at the base structure between the support units arranged at the corner portions.

4. The drilling rig according to claim 1,
wherein
the drilling rig is a mobile drilling rig,
each support unit is steerable and comprises at least one vertical steering axis and one steering drive, and
at least one of the support units comprises a wheel drive for rotatably driving at least one wheel for providing a self-propelling of the mobile drilling rig.

5. The drilling rig according to claim 1,
wherein
each support unit comprises at least one wheel drive.

6. The drilling rig according to claim 1,
wherein
each support unit comprises at least one wheel drive, and
a common control unit is provided for controlling the steering drives and the wheel drives for the support units.

7. The drilling rig according to claim 1,
wherein
the drilling tower comprises at least one horizontal folding axis, around which at least part of the drilling tower can be folded downwards.

8. The drilling rig according to claim 1,
wherein
at the base structure a plurality of support feet is arranged, which are vertically adjustable relative to the support units for supporting the drilling rig after movement and during drilling operation.

9. The drilling rig according to claim 1,
wherein
the wheels are of regular size having a diameter of not more than 2 meters.

10. A method for moving a drilling rig according to claim 1.

11. The method according to claim 10,
wherein
the drilling rig is steered by the support units and self-propelled or propelled by at least one tractor vehicle.

12. The drilling rig according to claim 1,
wherein
at least two first wheels are arranged rotatably around the first wheel axis and at least two second wheels are arranged rotatably around the second wheel axis.

13. The drilling rig according to claim 1,
wherein
the carrier element is mounted swingably at a mounting part, which itself is mounted turnably around the vertical steering axis at a support base of the support unit.

* * * * *